United States Patent
Tibah et al.

(10) Patent No.: US 11,326,107 B2
(45) Date of Patent: May 10, 2022

(54) UTILIZING PACKED COLUMNS FOR ASPHALT AIR BLOWING

(71) Applicant: Building Materials Investment Corporation, Wilmington, DE (US)

(72) Inventors: Denis Muki Tibah, Waxahachie, TX (US); Daniel E. Boss, Morris Township, NJ (US)

(73) Assignee: BUILDING MATERIALS INVESTMENT CORPORATION, Wilmington, DE (US)

( * ) Notice: Subject to any disclaimer, the term of this patent is extended or adjusted under 35 U.S.C. 154(b) by 89 days.

(21) Appl. No.: 16/800,352

(22) Filed: Feb. 25, 2020

(65) Prior Publication Data

US 2020/0270529 A1    Aug. 27, 2020

Related U.S. Application Data

(60) Provisional application No. 62/810,788, filed on Feb. 26, 2019.

(51) Int. Cl.
| | |
|---|---|
| *C10C 3/04* | (2006.01) |
| *B01J 19/30* | (2006.01) |
| *E04D 1/20* | (2006.01) |

(52) U.S. Cl.
CPC ............. *C10C 3/04* (2013.01); *B01J 19/30* (2013.01); *B01J 2219/30207* (2013.01); *B01J 2219/30296* (2013.01); *B01J 2219/30408* (2013.01); *B01J 2219/30433* (2013.01); *E04D 1/20* (2013.01)

(58) Field of Classification Search
CPC .... C10C 3/04; B01J 4/004; B01J 19/30; B01J 2219/30207; B01J 2219/30296; B01J 2219/30408; B01J 2219/30433; E04D 1/20
See application file for complete search history.

(56) References Cited

U.S. PATENT DOCUMENTS

| | | | |
|---|---|---|---|
| 1,782,186 | A | 11/1930 | Abson |
| 2,179,208 | A | 11/1939 | Burk et al. |
| 2,200,914 | A | 5/1940 | Burk et al. |
| 2,450,756 | A | 4/1945 | Hoiberg |
| 2,375,117 | A | 5/1945 | Lentz |
| 2,762,755 | A | 9/1956 | Kinnaird, Jr. |
| 3,126,329 | A | 3/1965 | Fort |
| 4,338,137 | A | 7/1982 | Goodrich |

(Continued)

*Primary Examiner* — Brian A McCaig
(74) *Attorney, Agent, or Firm* — Alvin T. Rockhill; Joshua C. Malino (57) ABSTRACT

It has been discovered that the efficiency of asphalt blow stills (reactor columns) can be improved by filling the blow still with various types of packing material, such as metal or glass spheres (or other rigid materials). The packing material acts to reduce air bubble size and improve the dispersion of the air bubbles throughout the asphalt. This increases the total surface area per unit volume of the air bubbles and promotes a faster processing time. The packing material also increases the contact time between the air bubbles and the asphalt which further results in improved efficiency and reduced blow times. This is beneficial because faster processing times can be achieved resulting in more efficient use of equipment, higher levels of productivity, lower energy requirements, cost savings, reduced blow loss, and reduced thermal history to which the asphalt is exposed.

4 Claims, 5 Drawing Sheets

(56) References Cited

U.S. PATENT DOCUMENTS

| | | | |
|---|---|---|---|
| 4,584,023 A | 4/1986 | Goodrich | |
| 6,631,890 B1 * | 10/2003 | Lau | B01J 19/30 |
| | | | 261/94 |
| 7,901,563 B2 | 3/2011 | Ruan et al. | |
| 2012/0132565 A1 * | 5/2012 | Aldous | C08L 95/00 |
| | | | 208/22 |
| 2014/0262935 A1 | 9/2014 | Soto et al. | |
| 2018/0086982 A1 | 3/2018 | Tibah et al. | |

* cited by examiner

UTILIZING PACKED COLUMNS FOR ASPHALT AIR BLOWING

CROSS REFERENCE TO RELATED APPLICATIONS

This application claims benefit of U.S. Provisional Patent Application Ser. No. 62/810,788, filed on Feb. 26, 2019. The teachings of U.S. Provisional Patent Application Ser. No. 62/810,788 are incorporated herein by reference in their entirety.

FIELD OF THE INVENTION

The invention relates to an improved blow still for air blowing asphalt to produce industrial asphalt faster with more efficient use of equipment, higher levels of productivity, lower energy requirements, cost savings, reduced blow loss, and reduced thermal history to which the asphalt is exposed.

BACKGROUND OF THE INVENTION

Asphalt is used in a wide array of applications and products due to its desirable combination of physical and chemical characteristics. For instance, asphalt offers outstanding binding and waterproofing characteristics. These physical attributes of asphalt have led to its widespread utilization in paving, roofing, and waterproofing applications.

For instance, asphalt is used in manufacturing roofing shingles because it has the ability to bind sand, aggregate, and fillers to the roofing shingle while simultaneously providing excellent water barrier characteristics. Asphalt is also used in products that are formulated to adhere various substrates together, such as in binding different layers of rubber together in manufacturing industrial rubber products.

Naturally occurring asphalts have been used in various applications for hundreds of years. However, today virtually all of the asphalt used in industrial applications is recovered from the refining of petroleum. Asphalt is essentially the residue that remains after gasoline, kerosene, diesel fuel, jet fuel, and other hydrocarbon fractions have been removed during the refining of crude oil. In other words, asphalt is the last and most heavy cut from the crude oil refining process.

To meet performance standards and product specifications, asphalt that is recovered from refining operations is normally treated or processed to attain desired physical characteristics and to attain uniformity. For instance, asphalt that is employed in manufacturing roofing products typically needs to be treated to meet the special requirements demanded in roofing applications. More specifically, in the roofing industry it is important to prevent asphaltic materials from flowing under conditions of high temperature, such as those encountered during hot summers. In other words, the asphaltic materials used in roofing products should maintain a certain level of stiffness (hardness) at high temperatures. This increased level of stiffness is characterized by a reduced penetration value, an increased viscosity, and an increased softening point.

To attain the desired set of properties needed in many applications, such as in manufacturing roofing tiles, the base asphalt is normally air blown to attain the required level of stiffness. During the air blowing procedure the asphalt reacts with oxygen in the air which results in it having a lower penetration value and a higher softening point. Air blowing catalysts are frequently added to the asphalt being air blown to reduce the time needed to attain the desired increase in softening point and reduction in penetration value.

Various chemicals and/or polymer modifiers are also frequently added to the asphalt (before or after air blowing) to attain the desired combination of properties needed in the particular application in which the asphalt will ultimately be used.

In conventional air blowing methods air is pumped through the asphalt for a period of about 2 to about 10 hours while it is maintained at an elevated temperature which is typically within the range of 400° F. (204° C.) to 550° F. (288° C.). The air blowing process optimally results in the stiffness and the softening point of the asphalt being significantly increased. This is highly desirable because ASTM D 3462-96 (Standard Specification for Asphalt Shingles Made from Glass Felt and Surfaced with Mineral Granules) requires roofing asphalt to have a softening point which is within the range of 190° F. (88° C.) to 235° F. (113° C.) and for the asphalt to exhibit a penetration at 77° F. (25° C.) of above 15 dmm (1 dmm=0.1 mm). In fact, it is typically desirable for asphalt used in roofing applications to have a penetration which is within the range of 15 dmm to 35 dmm in addition to a softening point which is within the range of 185° F. (85° C.) to 235° F. (113° C.).

Figure 1:
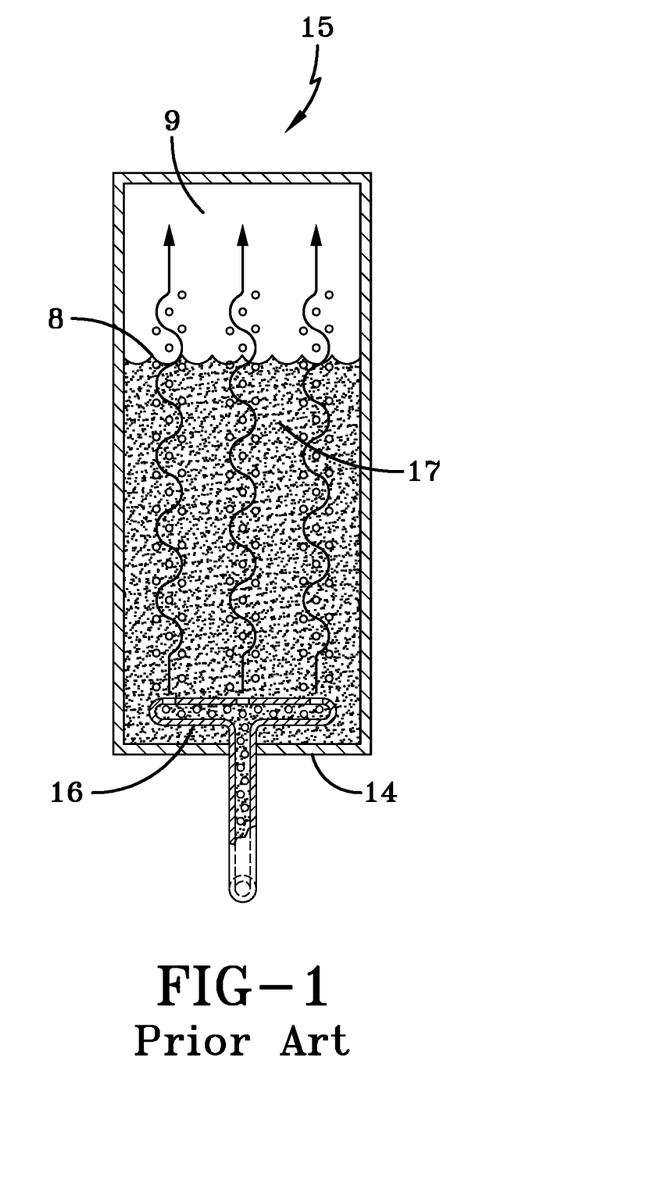
FIG. 1 is a schematic cross-sectional view of a conventional blow still which is equipped with a sparger.

In typical air blowing techniques the oxygen containing gas is introduced and distributed into the bottom 14 of an un-agitated blow still 15 through spargers 16. Once the oxygen containing gas (air) is in the system it travels up through the asphalt 17 and ultimately reaches the surface of the asphalt 8 at the top of the blow still as illustrated in FIG. 1. As the air travel through the asphalt from the bottom to the top of the blow still it is available to react with the asphalt being oxidized. The rate of chemical reactions occurring within the blow still is known to be limited by the diffusion of oxygen in the air bubbles traveling through the system. It is also known that mechanical agitation has a significant effect on the oxidation processing time by increasing the surface area of the air bubbles in the system. In any case, conventional asphalt oxidation techniques are currently mass transfer limited.

Air blowing has been used to increase the softening point and stiffness of asphalt since the early part of the twentieth century. For example, U.S. Pat. No. 2,179,208 describes a process wherein asphalt is air blown at a temperature of 300° F. (149° C.) to 500° F. (260° C.) in the absence of a catalyst for a period of 1 to 30 hours after which time a polymerization catalyst is added for an additional treatment period of 20 to 300 minutes at a temperature of 225° F. (107° C.) to 450° F. (232° C.).

Over the years, a wide variety of chemical agents have been used as air blowing catalysts. For instance, ferric chloride, $FeCl_3$ (see U.S. Pat. No. 1,782,186), phosphorous pentoxide, $P_2O_5$ (see U.S. Pat. No. 2,450,756), aluminum chloride, $AlCl_3$ (see U.S. Pat. No. 2,200,914), boric acid (see U.S. Pat. No. 2,375,117), ferrous chloride, $FeCl_2$, phosphoric acid, $H_3PO_4$ (see U.S. Pat. No. 4,338,137), copper sulfate CuSO, zinc chloride $ZnCl_2$, phosphorous sesquesulfide, $P_4S_3$, phosphorous pentasulfide, $P_2S_5$, and phytic acid, $C_6H_6O_6(H_2PO_3)_6$ (see U.S. Pat. No. 4,584,023) have all been identified as being useful as air blowing catalysts.

U.S. Pat. No. 2,179,208 discloses a process for manufacturing asphalts which comprises the steps of air-blowing a petroleum residuum in the absence of any added catalysts while maintaining the temperature at about 149° C. to 260° C. (300° F. to 500° F.) and then heating the material at a temperature at least about 149° C. (300° F.) with a small amount of a polymerizing catalyst. Examples of such polymerizing catalysts include chlorosulphonic, phosphoric, fluoroboric, hydrochloric, nitric or sulfuric acids and halides as ferric chloride, aluminum bromide, chloride, iodide, halides similarly of copper, tin, zinc, antimony, arsenic, titanium, etc. hydroxides of sodium, potassium, calcium oxides, sodium carbonate, metallic sodium, nitrogen bases, ozonides and peroxides. Blowing with air can then be continued in the presence of the polymerizing catalyst.

Several patents describe the application of phosphoric mineral acids in modifying asphalt properties. For instance, U.S. Pat. No. 2,450,756 describes a process to make oxidized asphalts by air blowing petroleum hydrocarbon in the presence of a phosphorus catalyst, including phosphorus pentoxide, phosphorus sulfide, and red phosphorus. U.S. Pat. No. 2,762,755 describes a process of air blow asphaltic material in the presence of a small amount of phosphoric acid. U.S. Pat. No. 3,126,329 discloses a method of making blown asphalt through air blowing in the presence of a catalyst which is an anhydrous solution of 50 weight percent to 80 weight percent phosphorus pentoxide in 50 weight percent to 20 weight percent phosphoric acid having the general formula $HmRnPO4$.

U.S. Pat. No. 2,762,756 discloses a process for manufacturing asphalt which comprises: passing an asphalt charge stock through as ejector into which air is inducted simultaneously by the flow of the said charge stock, whereby said charge stock is dispersed in air, the ratio of said asphalt charge to air being from about 1.6 to about 5.6 gallons per minute per 1 cubic foot of air per minute, and the temperature being maintained between about 300° F. and about 550° F.; and discharging the reaction product of said asphalt charge stock and air directly into the vapor space of a separator.

United States Patent Application Publication No. 2012/0132565 A1 discloses a process for increasing the softening point of asphalt comprising the following steps: providing a liquid jet ejector comprising a motive inlet, a motive nozzle, a suction port, a main ejector body, a venturi throat and diffuser, and a discharge connection; conducting a preheated asphalt feed including fresh asphalt and recycled oxidized asphalt, at a temperature from 125° C. to 300° C., as the motive liquid into the motive inlet of the liquid jet ejector; drawing atmospheric air or compressed air into the suction port of the liquid jet ejector; mixing the preheated asphalt within the main ejector body with the air from the suction port of the liquid jet ejector to form a mixture; conducting the mixture to a heated and pressurized oxidizer vessel; collecting an off-gas from the overhead of said oxidizer vessel and an oxidized asphalt product stream from the bottoms of said oxidizer vessel, wherein said oxidized asphalt product stream has softening temperature greater than the preheated asphalt feed; and recycling a portion of the oxidized asphalt product stream back to the liquid jet ejector to form the recycled oxidized asphalt.

United States Patent Application Publication No. 2014/0262935 A1 discloses a method for oxidizing asphalt which comprises dispersing an oxygen containing gas throughout an asphalt in an oxidation zone while the asphalt is maintained at a temperature which is within the range of about 400° F. to 550° F., wherein the oxygen containing gas is introduced into the oxidation zone through a recycle loop. The recycle loop pumps asphalt from the oxidation zone and reintroduces the asphalt into the oxidation zone as oxygen enhanced asphalt. The recycle loop will typically include a pump which pulls the asphalt from the oxidation zone and which pumps the oxygen enhanced asphalt into the oxidation zone and wherein the oxygen containing gas is injected into the recycle loop at a point before the asphalt enters into the pump.

All of the air blowing techniques described in the prior art share the common characteristic of both increasing the softening point and decreasing the penetration value of the asphalt treated. In other words, as the asphalt is air blown, its softening point increases and its penetration value decreases over the duration of the air blowing procedure. It has been the conventional practice to air blow asphalt for a period of time that is sufficient to attain the desired softening point and penetration value. Today there continues to be a need for a process that can be used to more efficiently air blow asphalt to the desired penetration value and softening point needed in specific industrial applications. For example, to air blow asphalt to both a softening point which is within the range of 185° F. (85° C.) to 250° F. (121° C.) and a penetration value at 77° F. (25° C.) of above 15 dmm.

SUMMARY OF THE INVENTION

This invention is based on a unique method for distribution of an oxygen containing gas throughout the asphalt in an air blowing process. This technique utilizes a blow still that contains a packing material. The packing material can be comprised of a wide range of materials, including but not limited to, spheres, pellets, chips, Raschig rings, modified spheres, knitted filaments, wire gauze, wire mesh, course steel wool, and the like. The packing material, in some embodiments, is comprised of a metal, glass, ceramic, or another material that will not degrade or interfere with the air blowing process. In any case, the packing material acts to reduce air bubble size and improve the dispersion of the air bubbles throughout the asphalt. The reduced air bubble size accordingly increases the total surface area per unit volume of the air bubbles and in turn promotes a faster processing time. The packing material also increase the contact time between the air bubbles and the asphalt which further results in improved efficiency and reduced blow times. This is highly beneficial because faster processing times can be achieved which, of course, results in more efficient use of equipment, higher levels of productivity, lower energy requirements, and cost savings.

The packed blow still of this invention reduces the overall level of oxidizing gas, such as an oxygen containing gas (air or oxygen enhanced air), pure oxygen, chlorine enriched air, pure chlorine, and the like, needed to attain desired asphalt characteristics via the oxidation process. Accordingly, the level of carry over blow loss (the amount of asphalt blown out of the blow still during the process) can be reduced. This is, of course, highly beneficial in that the yield of oxidized asphalt is increased, leading to better efficiency and less environmental impact since less volatile material is lost to the environment. In other words, by utilizing the packed asphalt blow still of this invention, the air blow time required to produce industrial asphalt for utilization in industrial applications, such as in manufacturing asphalt roofing shingles, can be reduced. Accordingly, utilizing the packed asphalt blow still of this invention increases the capacity of air blowing units and also reduces the energy consumption required to produce industrial asphalt having needed characteristics. Because the asphalt is air blown for a shorter period of time the amount of blow loss (asphalt lost during the air blowing procedure) is reduced as is the amount of material emitted into the environment. Accordingly, the technique of this invention reduces the cost of raw materials and lessens the environmental impact of the air blowing procedure.

The present invention more specifically discloses a blow still which is particularly useful for air blowing asphalt into an industrial asphalt having a lower penetration value and a higher softening point than that of the asphalt, said blow still being comprised of a top end, a bottom end, and at least one side wall which extends from the bottom end to the top end and defines the side borders of the blow still, said blow still having at least one oxidation section, wherein the oxidation section is at least partially packed with a packing material, said blow still being further comprised of an oxidizing gas introduction inlet which is situated within the oxidation section of the blow still.

The subject invention further reveals a method for air blowing asphalt into industrial asphalt comprising introducing an oxidizing gas into the asphalt which is contained within a blow still by charging the oxidizing gas into the asphalt in the blow still for a period of time which is sufficient to decrease the penetration value of the asphalt and to increase the softening point of the asphalt while the asphalt is being maintained at a temperature which is within the range of 350° F. to 550° F., wherein the blow still is at least partially packed with a packing material.

DETAILED DESCRIPTION OF THE INVENTION

Figure 2:
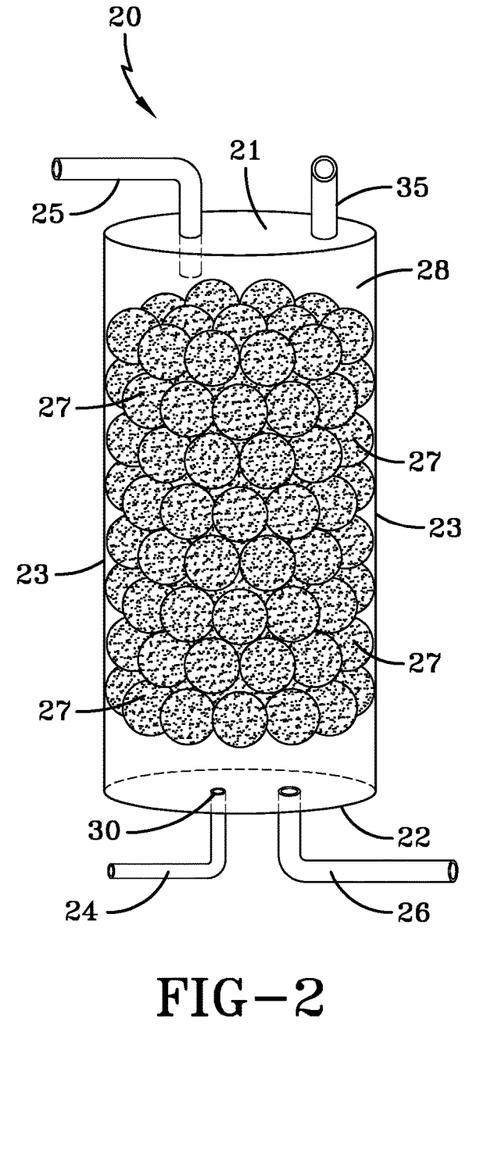
FIG. 2 is a schematic cross-sectional view of a blow still of this invention which is packed with a spherical packing material.
Figure 7:
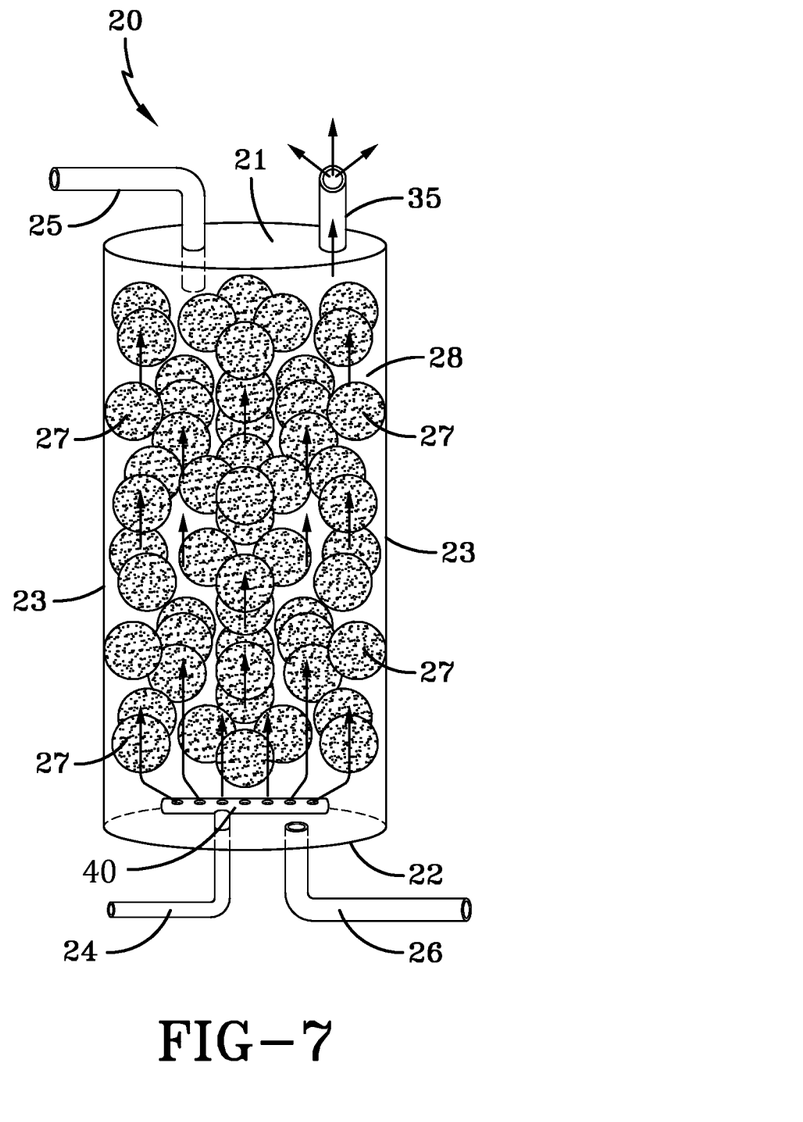
FIG. 7 is a schematic cross-sectional view of a blow still of this invention which is equipped with a sparger.

FIG. 2 depicts a blow still 20 having the design of this invention. This blow still 20 has a top 21, a bottom 22, a wall 23 which encompasses the entire circumferential side of the blow still 20, an asphalt inlet 25, an asphalt outlet 26, an oxidizing gas supply line 24, and an oxidizing gas introduction inlet 30. A sparger 40 as would be found in many conventional blow stills for oxidizing asphalt in the preparation of industrial asphalt can optionally be included as illustrated in FIG. 7. However, blow still 20 is packed with a multitude of metal spheres 27 (steel ball bearings) as packing material. This packing material acts to reduce the bubble size of the oxidizing gas and to improve the dispersion of the gas bubbles throughout the asphalt as the gas bubbles flow upwardly from an oxidizing gas introduction inlet 30 (such as the sparger 40 shown in FIG. 7) at the bottom of the blow still to the top of the blow still. The packing material also increases the residence time of the bubbles of the oxidizing gas, e.g., air or oxygen enhanced air, in the blow still 20 as they move upwardly through the blow still from the oxidizing gas introduction inlet 30 at the bottom 22 of the blow still 20 until they ultimately exit the blow still 20 through the discharge port 35 at the top 21 of the blow still 20. The blow still 20 can be completely or only partially filled with the packing material. However, in most cases the blow still 20 will only be partially filled with the packing material with an air space 28 being left unfilled at the top of the blow still 20 to allow for efficient removal of exhaust gases through the discharge port 35.

Figure 3:
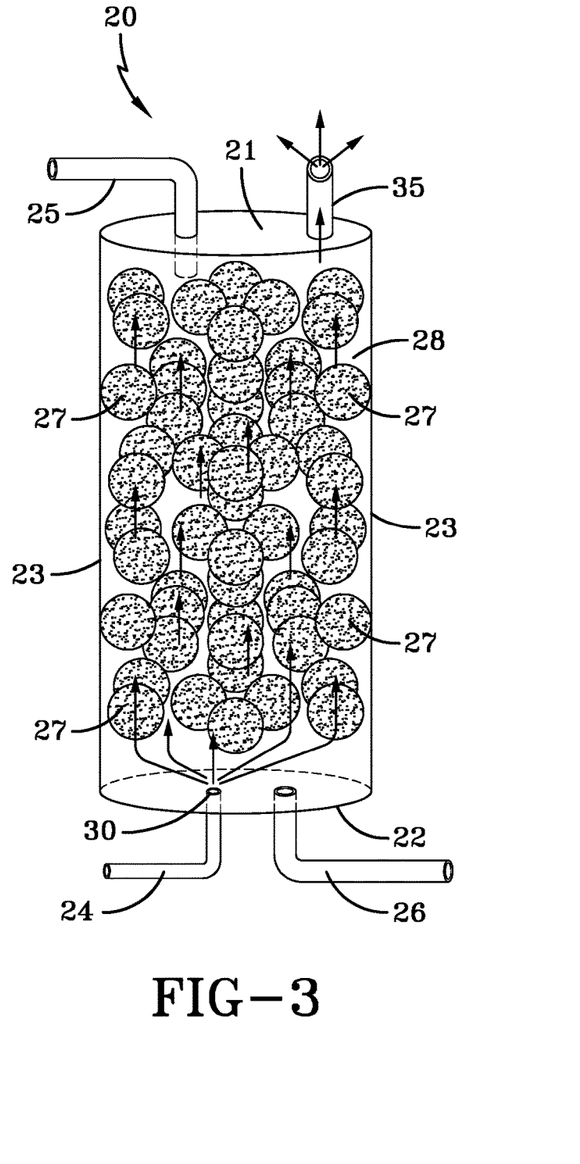
FIG. 3 is a schematic cross-sectional view of a blow still of this invention which is partially packed with a spherical packing material.

The blow stills of this invention can be filled to any desired level with packing material. In most cases, at least about 10 percent of the volume of the blow still will be packed with the packing material. However, in some embodiments, 20 percent to 80 percent of the volume of the blow still will be packed with the packing material. In many cases it is desirable to leave at least the upper 20 percent to 30 percent of the blow still unpacked to allow for better discharge of exhaust gases (the oxidizing gas which has been circulated through the blow still). In some embodiments, 40 percent to 75 percent of the volume of the blow still will be packed with the packing material and in yet other embodiments, 50 percent to 90 percent of the volume of the blow still will be packed with the packing material. In some embodiments, at least 50 percent, at least 60 percent, at least 70 percent, at least 80 percent, or at least 90 percent of the volume of the blow still will be filled with the packing material. A blow still which is only partially filled with a packing material is illustrated in FIG. 3.

In one embodiment of this invention the blow still can further contain one or more perforated plates as described in U.S. patent application Ser. No. 15/716,997, filed on Sep. 27, 2017. The teachings of U.S. patent application Ser. No. 15/716,997 are incorporated by reference herein in their entirety. However, in cases where blow stills containing such perforated plates are packed it is important to select a packing material that will not block the perforations in the plates in a manner that stops or significantly reduces or plugs the flow of the asphalt or oxidizing gas through the blow still. For instance, in cases where the plates are perforated with round holes it would not be desirable to pack the blow still with spheres of a size that would become lodged or wedged in the holes thereby blocking the flow of asphalt and oxidizing gas through the hole.

Figure 4:
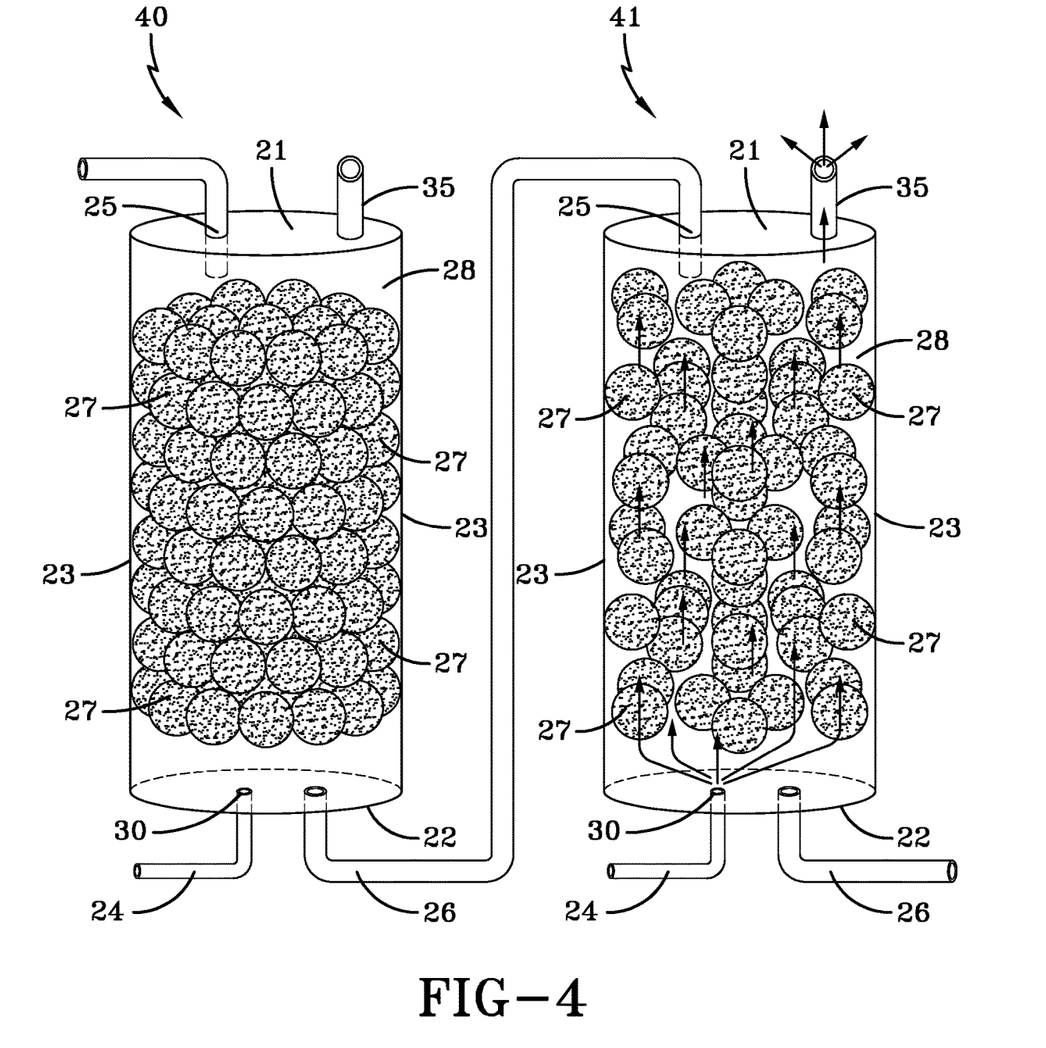
FIG. 4 is a schematic cross-sectional view of an air blow unit of this invention which includes a series of two blow stills which are packed with a spherical packing material in accordance with this invention.

In another embodiment of this invention two blow stills which are packed with a spherical packing material in accordance with this invention are used in series to attain desired asphalt characteristics (see FIG. 4). In this configuration the asphalt which is oxidized in the first blow still 40 is further oxidized in the second blow still 41 to attain a further increase in the final softening point and decrease in the final penetration value.

The packing material employed in the practice of this invention can be of a wide range of geometric designs, including but not limited to, spheres, modified spheres, ribbons, pellets, chips, rings, knitted filaments, wire gauze, wire mesh, and the like. The packing material, in some embodiments, is comprised of at least one of: metal, glass, ceramic, or another material that will not degrade or interfere with the air blowing process. Packing material which is suitable for use in the practice of this invention is available from a wide variety of commercial sources. For instance, steel ball bearings or spherical glass marbles from commercial sources can be used in the practice of this invention. The ball bearings used in the practice of this invention as packing material can be comprised of a ceramic (silicon nitride, $Si_3N_4$) or a metal, such as carbon steel, chrome steel, stainless steel, and the like. The ball bearings used do not need to be made to high tolerances and ball bearings having an Annular Bearing Engineering Committee (ABEC) class rating of 1 are perfectly suitable for use. In fact, the ball bearings used can include various surface blemishes, such as scratches, divots, pits, and other surface defects. Ball bearings that are suitable for use in the practice of this invention are available from The Timken Company, 4500 Mount Pleasant Street NW, North Canton, Ohio 44720.

Spherical pieces which are modified to have raised points on them to increase surface area, metallic ribbons, and Raschig rings are also good choices for used as the packing material in the practice of this invention.

The blow still of this invention can be utilized in oxidizing virtually any type of asphalt. In practicing the method of this invention conventional asphalt oxidation techniques are employed with the exception that the blow still used is packed with a suitable packing material. In the technique of this invention, the asphalt is air blown by heating it to a temperature which is within the range of 350° F. (178° C.) to 550° F. (288° C.) and blowing an oxygen containing gas through it. This air blowing step may be conducted at a temperature which is within the range of 400° F. (204° C.) to 540° F. (171° C.), at a temperature which is within the range of 425° F. (218° C.) to 525° F. (274° C.) or within the range of 450° F. (232° C.) to 500° F. (260° C.). This air blowing step may take 2 hours to 10 hours, 3 hours to 10 hours, 4 hours to 10 hours, 5 hours to 10 hours, 6 hours to 10 hours, 7 hours to 10 hours, 8 hours to 10 hours, 9 hours to 10 hours, 2 hours to 9 hours, 2 hours to 8 hours, 2 hours to 7 hours, 2 hours to 6 hours, 2 hours to 5 hours, 2 hours to 4 hours, 2 hours to 3 hours, 3 hours to 9 hours, 4 hours to 8 hours, 5 hours to 7 hours or 3 hours to 6 hours. However, the air blowing step will be conducted for a period of time that is sufficient to attain the ultimate desired softening point. In other words, the asphalt will be air blown until a softening point of at least 100° F. (38° C.) is attained.

The oxygen containing gas (oxidizing gas) may be air. The air can contain moisture and can be enriched to contain a higher level of oxygen. Chlorine enriched air or pure oxygen can also be utilized as the oxidizing gas. In any case, the air blow can be performed either with or without a conventional air blowing catalyst. Some representative examples of air blowing catalysts include ferric chloride ($FeCl_3$), phosphorous pentoxide ($P_2O_5$), aluminum chloride ($AlCl_3$), boric acid ($H_3BO_3$), copper sulfate ($CuSO_4$), zinc chloride ($ZnCl_2$), phosphorous sesquesulfide ($P_4S_3$), phosphorous pentasulfide ($P_2S_5$), phytic acid ($C_6H_6[OPO-(OH)_2]_6$), and organic sulfonic acids. The asphalt oxidation of this invention can also be conducted in the presence of a polyphosphoric acid as described in U.S. Pat. No. 7,901,563. The teachings of U.S. Pat. No. 7,901,563 are incorporated by reference herein for the purpose of describing air blowing procedures which are conducted in the presence of a polyphosphoric acid.

The industrial asphalt made can be used in making roofing products and other industrial products using standard procedures. For instance, the industrial asphalt can be blended with fillers, stabilizers (like limestone, stonedust, sand, granule, etc.), polymers, recycled tire rubber, recycled engine oil residue, recycled plastics, softeners, antifungal agents, biocides (algae inhibiting agents), and other additives. The method of this invention is primarily applicable to the preparation of industrial asphalt which is used in roofing and other industrial products. Asphalt made in accordance with this invention is particularly useful in manufacturing roofing shingles because it has the ability to bind sand, aggregate, and fillers to the roofing shingle while simultaneously providing excellent water barrier characteristics.

This invention is illustrated by the following examples that are merely for the purpose of illustration and are not to be regarded as limiting the scope of the invention or the manner in which it can be practiced. Unless specifically indicated otherwise, parts and percentages are given by weight.

Examples 1-4

This series of experiments was conducted in a lab scale blow still which was approximately 1.3 feet tall and which had a diameter of 0.35 feet. The blow still used in Example 1 was conventional in that it was not compartmentalized into different oxidization sections and was not packed with any packing material. However, in the other experimental runs (Examples 2-4) the blow still was of the design illustrated in FIG. 2 and was partially packed with ball bearings.

The asphalt used as the starting material in all of these experiments had an initial penetration value which was within the range of 250 dmm to 400 dmm as measured at 77° F. In all cases the air blow temperature was held constant at 500° F.±5° F. The effect that the packing had on the oxidization of the asphalt can be seen by reviewing Table 1.

TABLE 1

| Example | Process Type | Blow Still Packing | Air Blowing Accelerant | Air Flow Rate | Air Blowing Time (Minutes) | Final Softening Point (° F.) | PEN at 77° F. (dmm) | Blow Loss (%) |
| --- | --- | --- | --- | --- | --- | --- | --- | --- |
| 1 (Comparative) | Batch | No | No | 50 g asphalt/lpm air | 210 | 216 | 17 | 3.24 |
| 2 | Batch | Yes | No | 50 g asphalt/lpm air | 80 | 211 | 19 | 1.62 |
| 3 | Continuous | Yes | No | 50 g asphalt/lpm air | 130 | 211 | 20 | — |
| 4 | Continuous | Yes | Yes | 50 g asphalt/lpm air | 90 | 209 | 25 | — |

As can be seen from Table 1, the time needed to air blow the asphalt to a given softening point was greatly reduced in the experimental runs where the blow still was packed with ball bearings (Examples 2-4). It further shows that the total amount of air (oxidizing gas) needed to achieve the same result was significantly reduced in the cases where the blow still was packed with the ball bearings. This series of experiments additionally shows that blow loss was significantly reduced by including the packing material in the blow still.

The inclusion of a packing material in the blow still also allows for the air blowing temperature to be reduced which reduced the level of blow loss while still being able to attain the same increase in softening point as is realized with conventional blow stills which are operated at higher temperatures. The use of packing material and a sparger is particularly effective in a churn-turbulent regime with the result being shorter processing times for a given flow rate when compared to systems that rely solely on a sparger. The increased processing efficiency achieved by packing a blow still could also allow for a reduction in the input air flow rate to achieve equivalent air blowing results which can enable the potential use of smaller blowers and/or blow stills. This can result in reducing installation cost, energy cost, and potentially size reduction in downstream ancillary systems and equipment for handling the fumes from the air blowing process.

Figure 5:
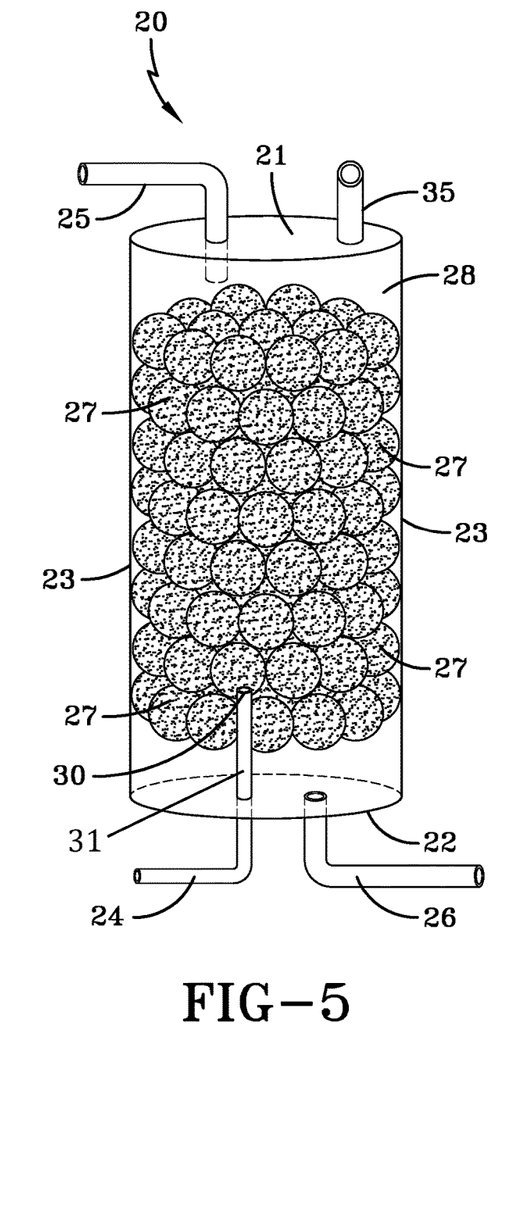
FIG. 5 is a schematic cross-sectional view of a blow still of this invention which is packed with a spherical packing material wherein the oxidizing gas introduction inlet is situated within the spherical packing material.
Figure 6:
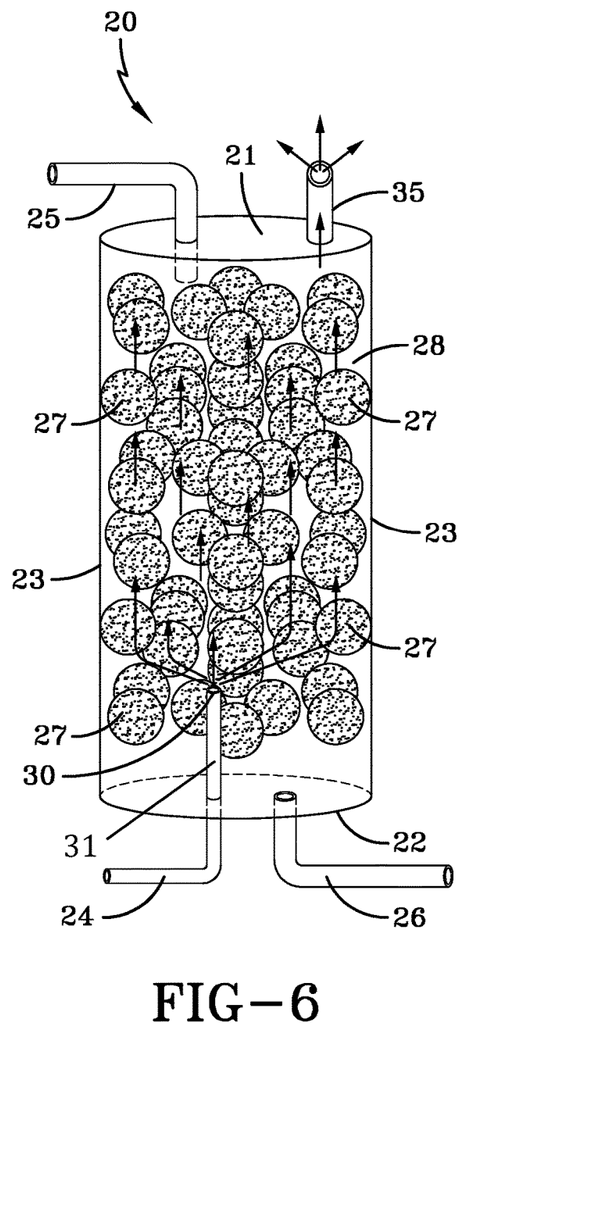
FIG. 6 is a schematic cross-sectional view of a blow still of this invention which is partially packed with a spherical packing material wherein the oxidizing gas introduction inlet is situated within the spherical packing material.

The use of packed blow stills can also enable a more efficient asphalt air blowing process without the use of specialized spargers when compared to the conventional process which utilizes specialized spargers. In a conventional asphalt blowing process, specialized spargers are typically designed with small holes at various orientations to create and disperse small air bubbles into the asphalt. However, the air bubbles are only small and uniformly dispersed in the vicinity of the sparger head. In conventional blow stills these small dispersed air bubbles quickly coalesce into larger bubbles and quickly rise to the tip of the blow still thus rendering them ineffective for further oxidization of asphalt. With the packed blow stills of this invention, the large bubbles are broken down into small bubbles as they pass through the packing material resulting in dissipation of the bubble kinetic energy. The rate at which the bubbles rise upwardly through the asphalt in the blow still is decreased giving the oxygen in the air bubbles more time to react with the asphalt (by increasing contact time). The use of the packing material also reduces or eliminates the cost of designing and cleaning specialized spargers having small holes numbering in the hundreds to the thousands. For instance, in practicing this invention a direct air injection device can be used to introduce an oxidizing gas into the blow still with the need for a sparger being eliminated. The direct air injection device can be as simple as an inlet pipe 31 having an oxidizing gas introduction inlet 30 through which the oxidizing gas is pumped into the blow still as illustrated in FIG. 5 and FIG. 6.

Eliminating spargers from blow stills also eliminates the possibility of the sparger clogging up during routine use and the problems associated therewith. For instance, in commercial operations sparger heads routinely get clogged and need to be cleaned on a recurring basis. It is necessary to take blow stills out of service to clean their sparger heads. This can result in a down time of over 48 hours during which the production capacity of the blow still is lost. Cleaning the sparger heads in blow stills is also labor intensive. Accordingly, the production capacity of a blow still can be increased and production costs can be reduced in systems having a direct air injection device which is not susceptible to clogging.

The utilization of packing material in blow stills can also allow for a significant reduction in the air blowing temperature without sacrificing output. Such a reduction in the oxidation temperature reduces the thermal stress generated on the reaction column during the thermal cycle of heating and cooling during the air blowing process which increases the life of the reaction column. This leads to additional cost savings by reducing the frequency of repairs performed on the reaction column and prolongs the life of the blow still by delaying the development of leaks. Blow loss is also reduced at lower temperatures due to less light end fractions being vaporized at the higher temperatures. Air blowing the asphalt at lower temperatures further allows for generating blown asphalt with a comparatively higher penetration value than would otherwise be attained due to less light fractions being stripped from the asphalt. This in turn allows for strategic asphalt sourcing and makes some asphalt streams which would not ordinarily be suitable for conventional air blowing due to low penetration values a viable alternative for air blowing with the blow still of this invention.

While certain representative embodiments and details have been shown for the purpose of illustrating the subject invention, it will be apparent to those skilled in this art that various changes and modifications can be made therein without departing from the scope of the subject invention. The illustrations and corresponding descriptions are not intended to restrict or limit the scope of the appended claims in any way.

What is claimed is:

1. A blow still comprising:
   a top end,
   a bottom end, and
   at least one side wall which extends from the bottom end to the top end and defines the side borders of the blow still,
   the blow still having at least one oxidation section,
   wherein the oxidation section is at least partially packed with a packing material, wherein the packing material comprises a plurality of ball bearings, glass marbles, or metal ribbons,
   the blow still having an oxidizing gas introduction inlet which is situated within the oxidation section of the blow still, and
   wherein the blow still is configured to feed an oxidizing gas into an asphalt to decrease a penetration value and increase a softening point of the asphalt.

2. The blow still of claim 1 wherein the oxidizing gas introduction inlet is a sparger.

3. The blow still of claim 1 wherein the oxidizing gas introduction inlet is a direct air injection device.

4. The blow still of claim 1 wherein the oxidizing gas introduction inlet is not a sparger.

\* \* \* \* \*